United States Patent [19]

Huyer

[11] Patent Number: 5,358,303
[45] Date of Patent: Oct. 25, 1994

[54] ROOF PANEL FOR A MOTOR VEHICLE

[75] Inventor: Johannes N. Huyer, Velserbroek, Netherlands

[73] Assignee: Vermeulen-Hollandia Octrooien II B.V., Haarlem, Netherlands

[21] Appl. No.: 99,805

[22] Filed: Jul. 30, 1993

Related U.S. Application Data

[63] Continuation of Ser. No. 735,413, Jul. 24, 1991, abandoned.

[30] Foreign Application Priority Data

Jul. 25, 1990 [NL] Netherlands ............... 9001686

[51] Int. Cl.$^5$ ................ B60J 7/05
[52] U.S. Cl. ................ 296/221; 296/223; 296/224
[58] Field of Search ............ 296/216, 221–224

[56] References Cited

U.S. PATENT DOCUMENTS

| | | | |
|---|---|---|---|
| 4,252,366 | 2/1981 | Rahm et al. | 296/222 |
| 4,601,512 | 7/1986 | Boots | 296/221 |
| 4,602,815 | 7/1986 | Boots et al. | 296/222 |
| 4,643,478 | 2/1987 | Boots | 296/221 |
| 4,647,105 | 3/1987 | Pollard | 296/222 X |
| 4,763,949 | 8/1988 | Haig | 296/222 |
| 4,995,665 | 2/1991 | Ichinose et al. | 296/213 |
| 5,028,090 | 7/1991 | Huyer | 296/221 |
| 5,092,651 | 3/1992 | Baldwin et al. | 296/221 X |

FOREIGN PATENT DOCUMENTS

| | | |
|---|---|---|
| 0140491 | 5/1985 | European Pat. Off. . |
| 2312901 | 9/1974 | Fed. Rep. of Germany . |
| 3442601A1 | 5/1986 | Fed. Rep. of Germany . |
| 3442615 | 5/1986 | Fed. Rep. of Germany . |
| 00017114 | 1/1988 | Japan ............... 296/216 |
| 2140500 | 11/1984 | United Kingdom . |

Primary Examiner—Dennis H. Pedder
Attorney, Agent, or Firm—Westman, Champlin & Kelly

[57] ABSTRACT

A Tiltable and slidable roof panel assembly for a motor vehicle comprises a roof panel (3) supported by a front support (4) and a rearward lifters (5) on a respective guide rail (6) extending along a side of an aperture (2) in the vehicle roof (1) and rearwardly beyond the aperture of the fixed roof. The lifter (5) is adapted to be driven by a driver means (8), on the one hand in a sliding movement along the guide rail (6) in order to slide the panel (3), and on the other hand in an up and down movement to enable the panel (3) to move between its closed position and an upwardly displaced venting position and between its closed position and a downwardly displaced position prior to the sliding movement of the panel. The lifter (5) includes a set-out lever (9) being at least pivotally in engagement with the panel through a first pivot (13) on the one hand and being pivotally and slidably connected with the guide rail (6) by a second pivot (11) on the other hand. An auxiliary lever (10) is in engagement with the set-out lever (9) spaced from the second pivot (11) during the pivoting movement of the panel. The movements of the set-out lever (9) are controlled by a forcing guide (10, 17, 23, 18, 24). The set-out lever (9) and the auxiliary lever (10) are guided during the pivoting movement of the panel (3) such that they both pivot and slide with respect to each other, whereby during the relative sliding movement between the set-out lever (9) and the auxiliary lever (10) one of these is substantially prevented from sliding relative to the guide rail (6) by means of a locking stop (30,31,20,33).

21 Claims, 7 Drawing Sheets fig.1 fig.4 fig.3 fig.2 fig.5a fig.5b fig.5c fig.6a fig.6b fig.6c fig.7a fig.7b fig.7c fig.8a fig.8b fig.8c fig.9

ROOF PANEL FOR A MOTOR VEHICLE

This is a continuation of application Ser. No. 07/735,413, filed Jul. 24, 1991, now abandoned.

BACKGROUND OF THE INVENTION

The present invention relates to a tiltable and slidable roof panel assembly for a motor vehicle, comprising a roof panel supported by a front support and rearward lifter means on a respective guide rail extending along a side of an aperture in the vehicle roof and rearwardly beyond the aperture of the fixed roof, the lifter means being adapted to be driven by driving means, on the one hand in a sliding movement along the guide rail in order to slide the panel, and on the other hand in an up and down movement to enable the panel to move between its closed position and an upwardly displaced venting position and between its closed position and a downwardly displaced position prior to the sliding movement of the panel, said lifter means including a set-out lever being at least pivotally in engagement with the panel through a first pivot on the one hand, and being pivotally and slidably connected with the guide rail by a second pivot on the other hand, and further including an auxiliary lever being in engagement with the set-out lever spaced from the second pivot during the pivoting movement of the panel, the movements of the set-out lever being controlled by a forcing guide.

Such a roof panel assembly is known from European patent application No. 0 343 750. Herein the set-out lever and the auxiliary lever together form scissors. The first adjusting movement of the scissors from the lowest sliding position takes place through the displacement of the scissors with respect to a slide plate in which there are formed guide slots forming a forcing guide with guide pins of the scissors.

In an earlier embodiment of these scissors (see U.S. Pat. No. 4,601,512) the first adjusting movement of the scissors takes place through a displacement of the sliding plate with respect to the scissors of which the front leg is locked against sliding movements.

The object of the present invention is to further improve these prior art roof panel assemblies.

For this purpose the roof panel assembly according to the invention is characterized in that the lever and the auxiliary lever are guided during the pivoting movement of the panel such that they both pivot and slide in respect to each other, whereby during the relative sliding movement between the set-out lever and the auxiliary lever one of these is substantially retained against sliding movement relative to the guide rail by means of a locking stop.

The invention will hereafter be elucidated with reference to the drawing showing an embodiment of the invention by way of example.

FIG. 5, 6, 7 and 8 are enlarged side views of the lifter means of FIG. 2, 3 and 4, in the sliding position, closed position, a first tilted position and a second tilted position of the panel, wherein the FIG. 5a, 6a, 7a and 8a illustrate the cooperation between the set-out lever and the auxiliary lever.

Figure 1:
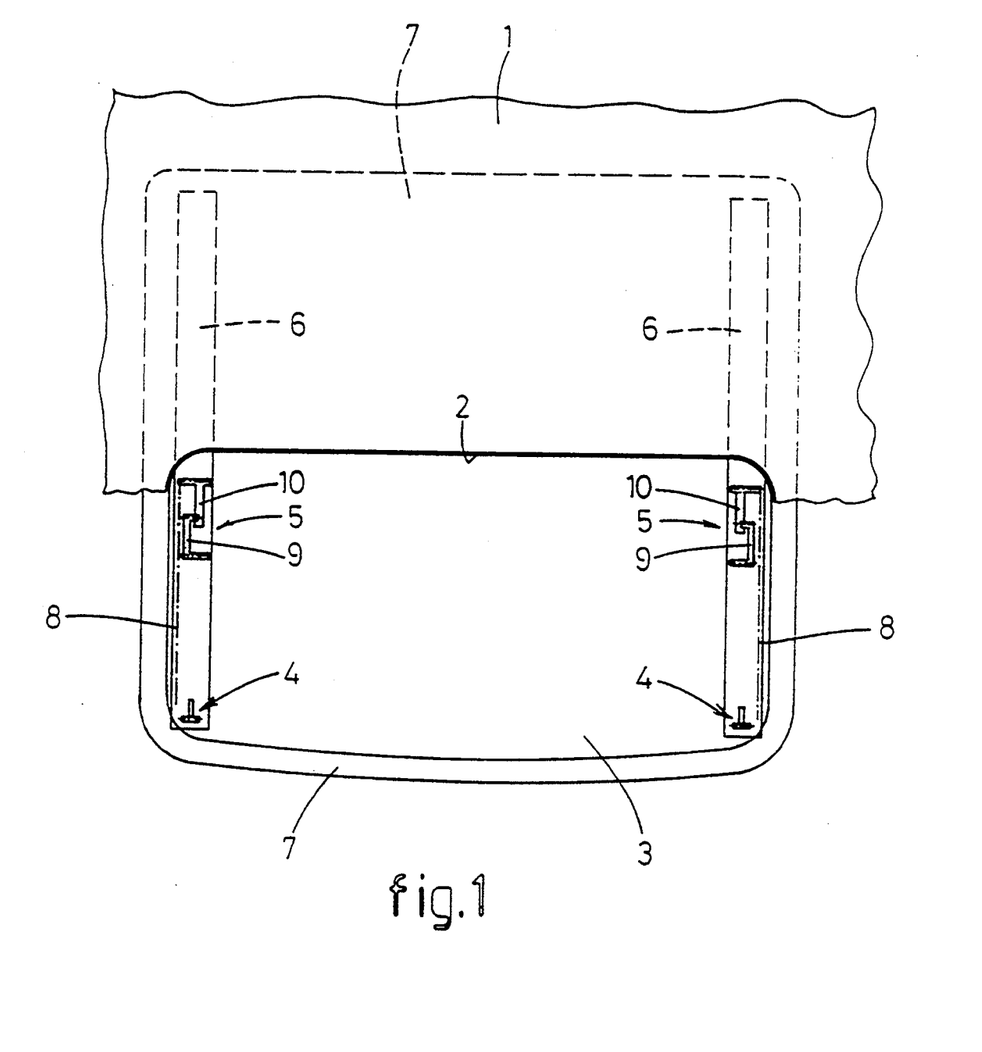
FIG. 1 is a very schematic plan view of the exemplary embodiments of the roof panel assembly according to the invention which is constructed as a tilting sliding roof.

FIG. 1 shows a roof panel assembly constructed as a tilting sliding roof and intended to be placed under the fixed roof 1 of a motor vehicle which is provided with a roof aperture 2. The tilting-sliding roof is provided with a rigid panel 3 which is transparent or not. This panel 3 is supported on both short sides by a front support 4 and a lifter means 5 provided at a distance behind it. The front support 4 and the lifter means 5 are slidably accommodated in a respective stationary guide rail 6 extending in the longitudinal direction of the vehicle on each side of aperture 2 and along a distance behind it. The stationary guide rails 6 are mounted on a stationary frame 7 which may be attached to the lower side of the fixed roof 1 of the vehicle. For adjusting the lifter means 5 a drive means, in this case constructed as a pull and push cable 8, engages the lifter means 5, said drive means being drivable manually or by an electric motor.

Figure 2:
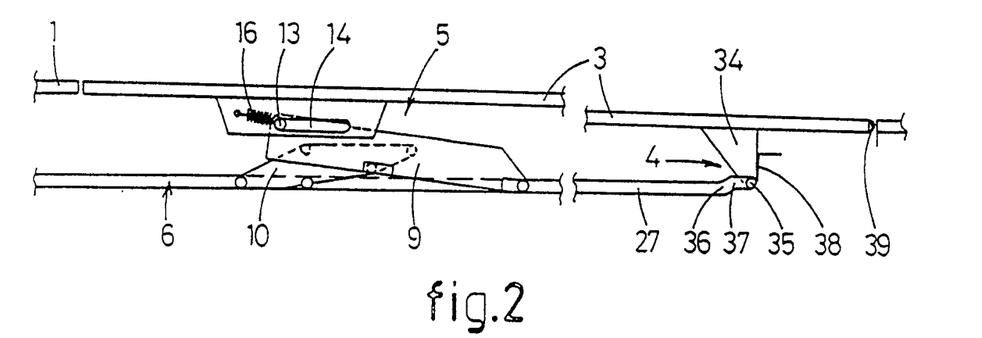
FIG. 2, 3 and 4 are very schematic longitudinal sectional views of the tilting-sliding roof of FIG. 1, in the closed position, tilted position and sliding position, respectively.
Figure 3:
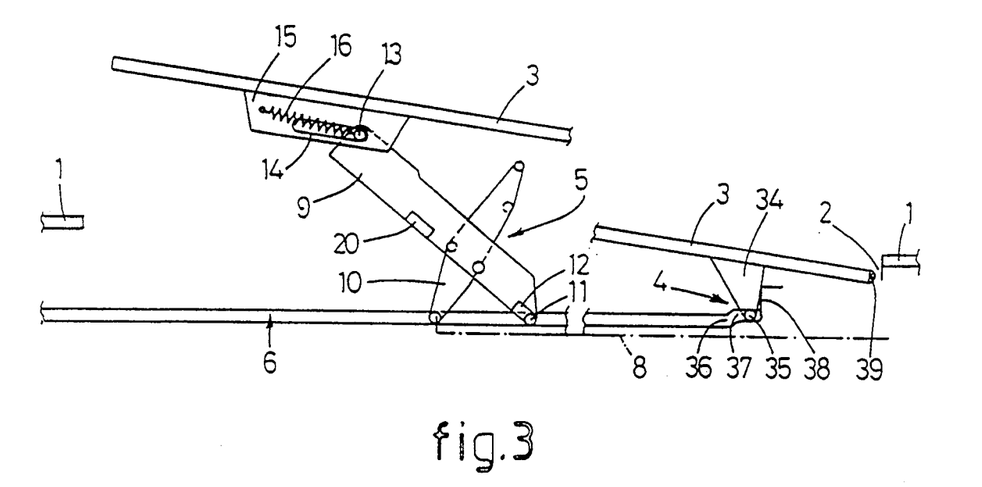
Figure 4:
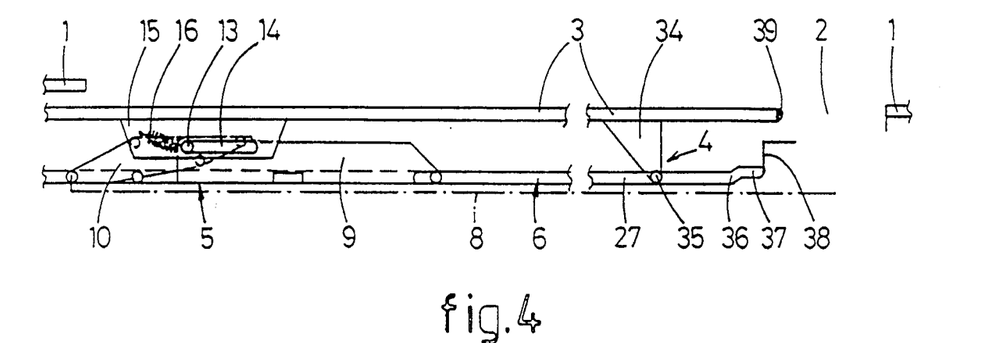

As is shown in FIG. 2, 3 and 4, the panel 3 of the tilting-sliding roof is adjustable between a closed position (FIG. 2) in which the panel 3 closes the aperture 2 in the fixed roof 1, and a rearwardly inclined tilted venting position (FIG. 3) on the one hand and between the closed position of FIG. 2 and a downwardly tilted and backwardly slid position of the panel 3 (FIG. 4) on the other hand.

As illustrated by FIG. 2–4, but in more detail by FIG. 5–9, each lifter means 5 of the panel 3 includes a set-out lever 9 and an auxiliary lever 10 cooperating with the set-out lever 9 and being in engagement therewith and being driven by the pull and push cable 8.

The set-out lever 9 is guided in the stationary guide rail 6 in a slidable manner during the sliding movement of the panel 3 and in a pivotable manner during the tilting movement of the panel 3 and this is accomplished by means of a transverse pin 11 projecting to both sides and a guide cam 12 configured concentrically around the transverse pin 11 and projecting to both sides of the set-out lever 9, the transverse pin 11 and guide cam 12 being positioned at the front and lower end of the set-out lever 9. At its rear, upper end the set-out lever 9 is provided with a pivot pin 13 engaging slidably and pivotally into a short longitudinal slot 14 in a section 15 under the panel 3. Between the pivot pin 13 and the section 15 of the panel 3 there is provided a spring means 16 continuously loading the panel 3 forwardly with respect to the pivot pin 13. In this manner the set-out lever 9 always forms a connection between the stationary guide rail 6 and the panel 3.

The set-out lever 9 further comprises as, a part of a forcing guide between set-out lever 9 and auxiliary lever 10, a first guide slot 17, which is closed at the rear end and open at the front end, and a second guide slot 18, which is open at the rear end and closed at the front end. The first guide slot 17 has a curved rear portion 17' and a straight front portion 17", and the second guide slot 18 comprising a straight rear portion 18', a curved central portion 18" and a short straight front portion 18'''. Concentrically around the front wall of the second guide slot 18 is formed a guide face 19 directed to the front. Finally the set-out lever 9 carries a guide cam 20 formed on the other side where the guide slots 17 and 18 are formed.

The auxiliary lever 10 comprises at its rear, lower end a horizontal first transverse pin 21 projecting to both sides and adapted for continuous engagement in the stationary guide rail 6. At a distance before the first transverse pin 21 on the auxiliary lever 10 there is arranged on it a second transverse pin 22 projecting to one side and being intended for engagement with the stationary guide rail 6 during a part of the adjusting movement of the lifter means 5. At its front upper end the auxiliary lever 10 has a horizontal first guide pin 23 for engagement in the first guide slot 17 in the set-out lever 9 during a part of the adjusting movement of the lifter means 5. At a distance behind the first guide pin 23 the auxiliary lever 10 carries a second guide pin 24 intended for engagement in the second guide slot 18 in the set-out lever 9 during another, but overlapping part of the adjusting movement of the lifter means 5. Concentrically around the second guide pin 24 is a guide face 25 on the auxiliary lever 10 for cooperation with the guide face 19 of the set-out lever 9 when the second guide pin 24 of the auxiliary lever 10 is at the front end of the second guide slot 18 in the set-out lever 9 and serves then as stationary pivot between the set-out lever 9 and auxiliary lever 10. Finally, the auxiliary lever 10 has near its front end a third transverse pin 26 for engagement with stationary guide rail 6 during part of the adjusting movement of the lifter means 5.

As particularly shown in FIG. 5b–8b, the stationary guide rail 6 for cooperation with the auxiliary lever 10 comprises a first guide groove 27 extending entirely horizontally and having a double structure, that is it extends on either side of the lifter means 5. In the first guide groove 27 the first transverse pin 21 of the auxiliary lever 10 is continuously guided, while the second transverse pin 22 of the auxiliary lever 10 is in engagement with the first guide groove 27 on one side of the lifter means 5 during a part of the adjusting movement of the lifter means 5. A short second guide groove 28 of the stationary guide rail 6 connects to the upper side of the first guide groove 27 and inclines upwardly and forwardly. The second guide groove 28 is intended for cooperation with the second transverse pin 22 and inclines forwardly and upwardly from the first guide groove 27. On its upper end the second guide groove is open to permit the exit and entrance of the second transverse pin 22 of the auxiliary lever 10. On one side of the lifter means 5, i.e. on the other side to where the second guide groove 28 is formed, the stationary guide rail 6 is provided with a third guide groove 29 with which the third transverse pin 26 of the auxiliary lever 10 is in engagement during a part of the adjusting movement of the lifter means 5. The third guide groove 29 has a long horizontal rear portion 29' and a short upwardly inclining front portion 29" which is open on the upper end to permit the exit and entrance of the third transverse pin 26 of the auxiliary lever 10.

As shown best in FIG. 5c–8c, the stationary guide rail 6 for cooperation with the set-out lever 9 is provided with a front stop 30 in the first guide groove 27 in which also the transverse pin 11 of the lever 9 engages. The stop 30 has the shape of a segment of a circle and is meant to serve as a pivot socket for the transverse pin 11 during lifting movements of the set-out lever 9 which causes tilting of the panel 3. Concentrically around the stop 30 is a guide and locking face 31 formed in the stationary guide rail 6 and having the shape of a segment of a circle in order to cooperate with the guide cam 12 on both sides of the set-out lever 9. At a distance behind the front stop 30 is a passage opening 32 in the stationary guide rail 6 on one side of the lifter means 5. This passage opening 32 is provided with a rear guide and locking wall 33 concentric with the guide and locking face 31 and intended for cooperation with and permitting passage of the guide cam 20 on one side of the set-out lever 9 between the guide groove 27 in the stationary guide rail 6 and the space above the stationary 6.

Figure 9:
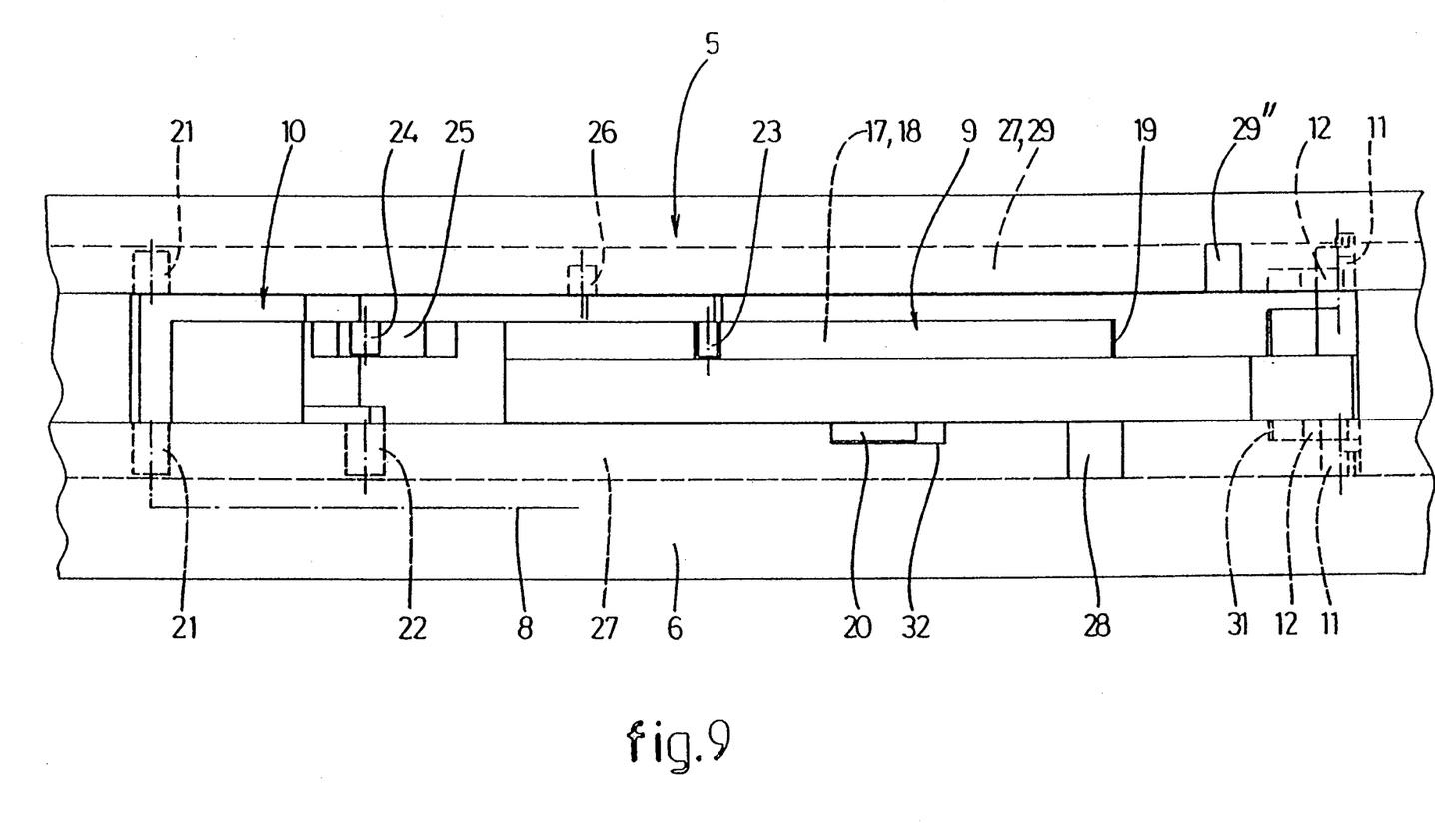
FIG. 9 is an enlarged plan view of the lifter means in the position of FIG. 5.

FIG. 9 further shows in what manner the set-out lever and the auxiliary lever 10 are configured when viewed from above. It can be noted, that there is no attachment whatsoever such as for example screws and the like either between the two levers 9 and 10 or between the set-cut lever 9 and the panel 3 or between the auxiliary lever 10 and the driving means 8. The various components are configured such that the "loose" components are locked in lateral direction relative to each other through their being mounted in the stationary guide rail. The connections are then accomplished mainly by pin-hole or pin-slot connections, which keeps the number of assembly steps low. Of course, such a construction could also be used for all kinds of other lift or support and adjusting means.

The operation of the tilting sliding roof as shown in the drawing, and in particular of the lifter means 5 thereof will now be elucidated with reference to FIG. 5–8.

Figure 5A:
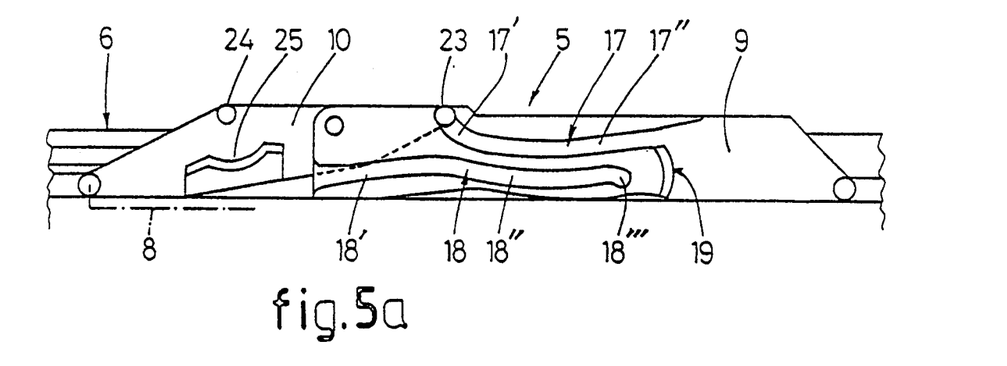
Figure 5B:
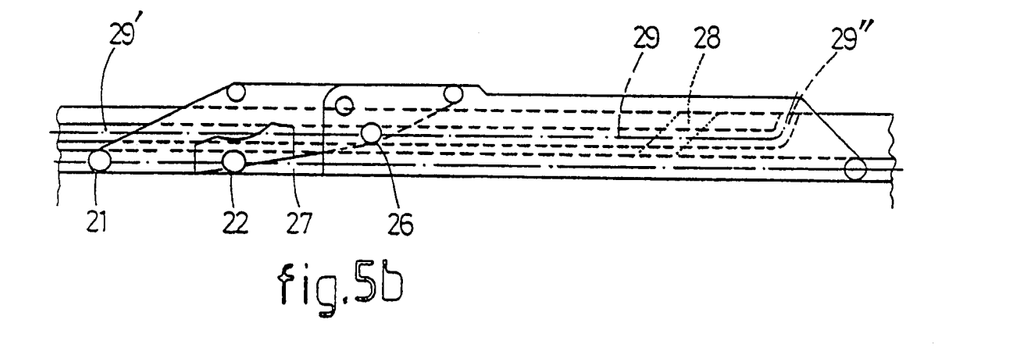
FIG. 5b, 6b, 7b and 8b show the cooperation between the auxiliary lever and the stationary guide rail and FIG. 5c, 6c, 7c and 8c elucidate the cooperation between the set-out lever and the guide rail.
Figure 5C:
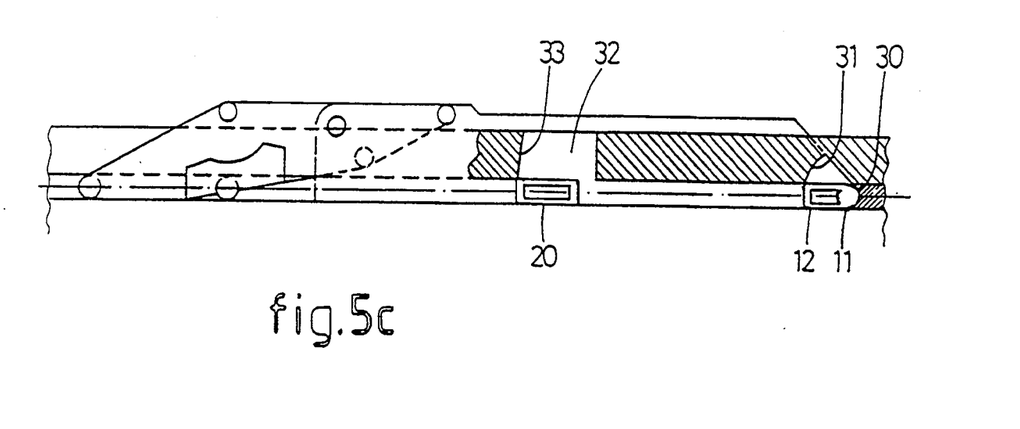

In the position of the lifter means 5 as shown in FIG. 5a–5c, the panel 3 is in its position in which it is moved downwardly from the closed position and in which it may be slid back and forth under the fixed roof of the vehicle. In this position the set-out lever 9 and the auxiliary lever 10 are interconnected by engagement of the third guide pin 23 in the first guide slot 17 of the set-out lever 9 on the rear end of this guide slot 17 (FIG. 5a). The auxiliary lever 10 driven by the pull and push cable 8 is locked against pivoting by means of the engagement of the second transverse pin 22 and the third transverse pin 26 in the first guide groove 27, and the third guide groove 29, respectively, of the stationary guide rail 6 in addition to the engagement between the first transverse pin 21 of the auxiliary lever 10 and the first guide groove 27 (FIG. 5b). Also the set-out lever 9 is locked against pivoting during the sliding movement of the panel 3 by means of the engagement of the guide cams 12 and 20 of the set-out lever 9 in the first guide groove 27 of the stationary guide rail 6 in addition to the engagement of the transverse pin 11 in this first guide groove 27 (FIG. 5c). As according to FIG. 5a the first guide pin 23 of the auxiliary lever 10 is in engagement with the inclined portion 17' of the first guide slot 17 in the set-out lever 9, the levers 9 and 10 which are locked against pivoting, are each locked against sliding relative (in relation) to each other so that they slide as a unit in the stationary guide rail 6. From FIG. 5 it will be clear that the set-out lever 9 and the auxiliary lever 10 form a very flat unit in their lowest position while there are also no other elements projecting above them so that the built-in height of the tilting-sliding roof can be kept down.

Figure 6A:
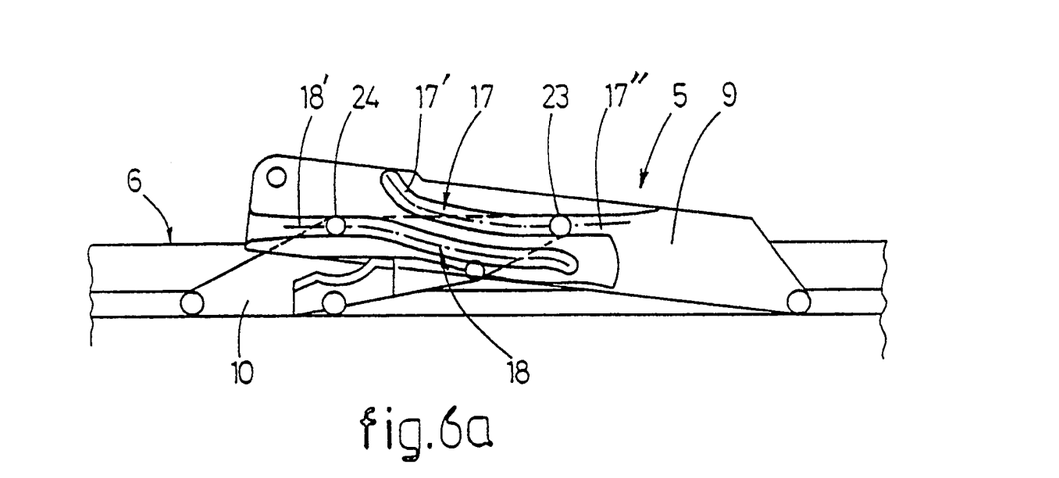
Figure 6B:
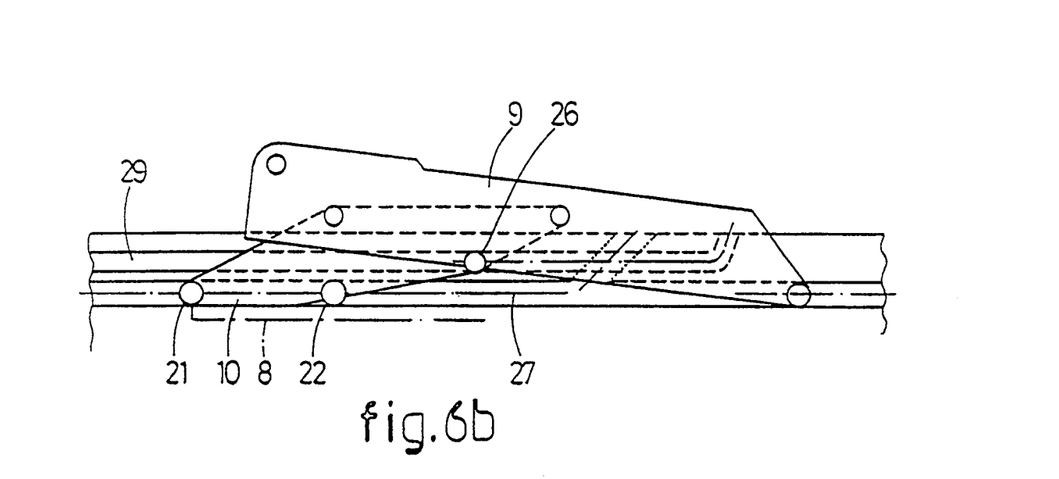
Figure 6C:
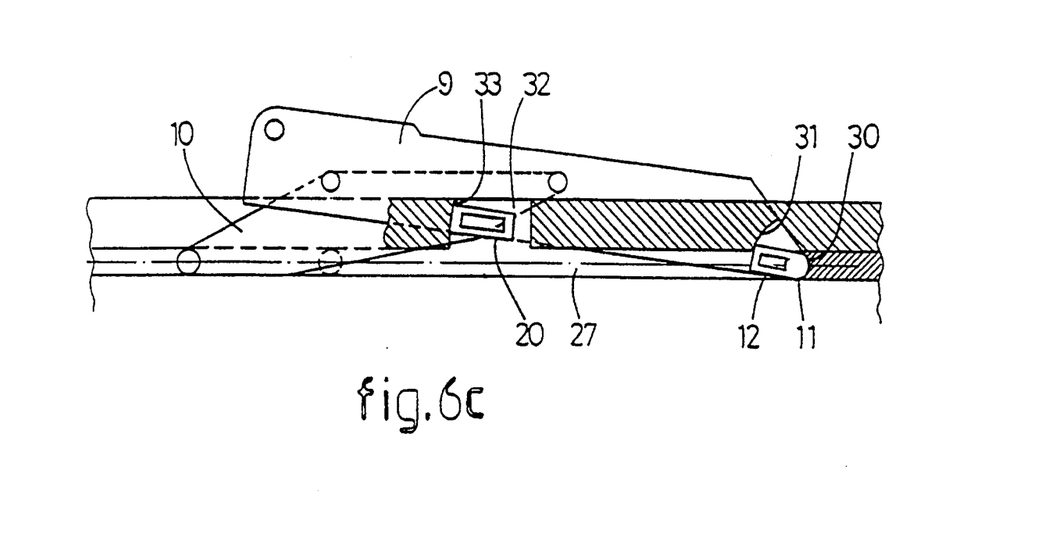

In FIG. 6a–6c the panel 3 is tilted slightly upward from its lower sliding position to the closed position as a result of a rotation through a small angle of the set-out lever 9 of the lifter means 5.

As shown in FIG. 6a, the rotation of the set-out lever 9 is caused by the displacement of the first guide pin 23 of the auxiliary lever 10 through the curved first portion 17' of the first guide slot 17 in the stationary guide rail 9. This displacement of the first guide pin 23 through the first guide slot 17 is first accomplished because according to FIG. 6c the transverse pin 11 at the front of the set-out lever 9 has run into the first stop 30 of the first guide groove 27 of the stationary guide rail 6. In this manner a further forward sliding movement of the set-out lever 9 with respect to the stationary guide 6 is prevented. The rotation of the set-out lever 9 is permitted because the guide cams 12 and 20 of the set-out lever 9 are no longer prevented from an upward displacement by the upper wall of the first guide groove 27 in the stationary guide rail 6 and are now allowed to move upwardly along their respective guide and locking face 31 and guide and locking wall 33, respectively. As a consequence, a forward sliding movement of the auxiliary lever 10 causes a relative displacement between the auxiliary lever 10 and the set-out lever 9, whereby the set-out lever 9 pivots upwardly in correspondence with the downward path of the first guide slot 17 and the horizontal sliding movement of the first guide pin 23 of the auxiliary lever 10.

As is shown again in FIG. 6a, the second guide pin 24 has entered the second guide slot 18 in the set-out lever 9 through the open rear end during the displacement of the first guide pin 23 of the auxiliary lever 10 through the first guide slot 17 in the set-out lever 9. In the position of the lifter means 5 as shown, which corresponds to the closed position of the panel 3, the slot portions 17'' and 18' of the first guide slot 17 and the second guide slot 18, respectively, are aligned and extend horizontally thereby causing a very stable support of the panel 3 in its closed position due to the triple fixed support of the set-out lever 9 in vertical direction. In an attempt to force the panel 3, for example during an attempted burglary, a vertical force on the panel will not cause any horizontal force on the pull and push cable, so that the panel 3 is locked in its closed position in a very stable manner.

As clearly shown in FIG. 6c, a locking of the set-out lever 9 of the lifter means 5 in horizontal direction is also ensured, in forward direction through the abutment of the transverse pin 11 to the stop 30 of the stationary guide rail 6 and in rear direction through the abutment of the guide cam 20 of the set-out lever 9 to the rear guide and locking wall 33 of the passage opening 32 in the stationary guide rail. Also guide cam 12 on the front end of the set-out lever 9 is to a certain extent already in engagement with the guide and locking face 31, but in the first part of the upward rotation of the set-out lever 9 the abutment of the guide cam 20 against the guide and locking wall 33 forms a more secure lock against a horizontal sliding movement of the set-out lever 9.

As shown finally in FIG. 6b, the auxiliary lever 10 is still locked against rotation or pivoting by the engagement of the transverse pins 22 and 26 in the horizontal portion of the respective guide grooves 27 and 29.

Figure 7A:
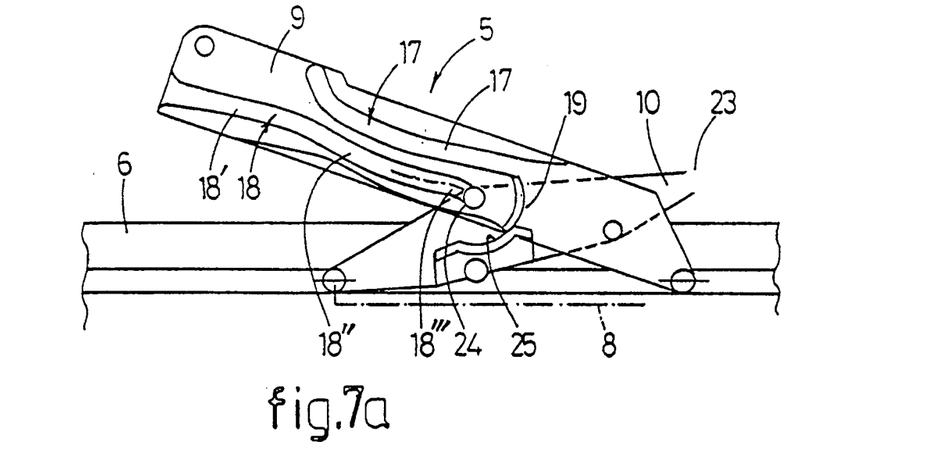
Figure 7B:
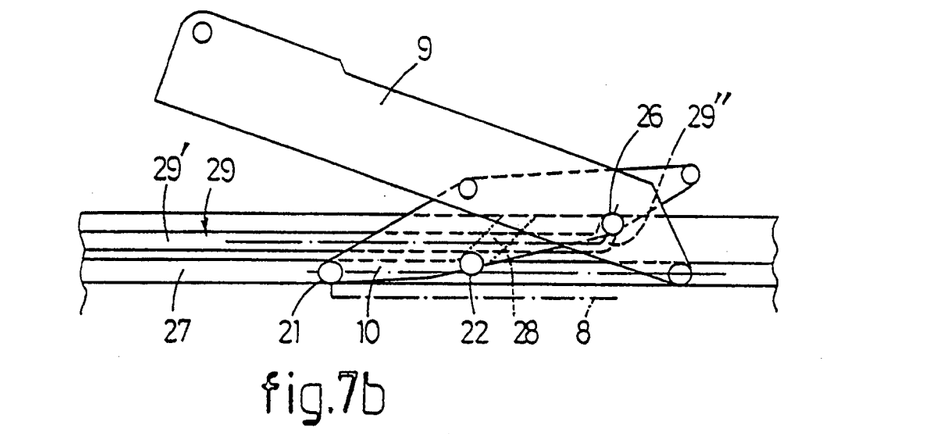
Figure 7C:
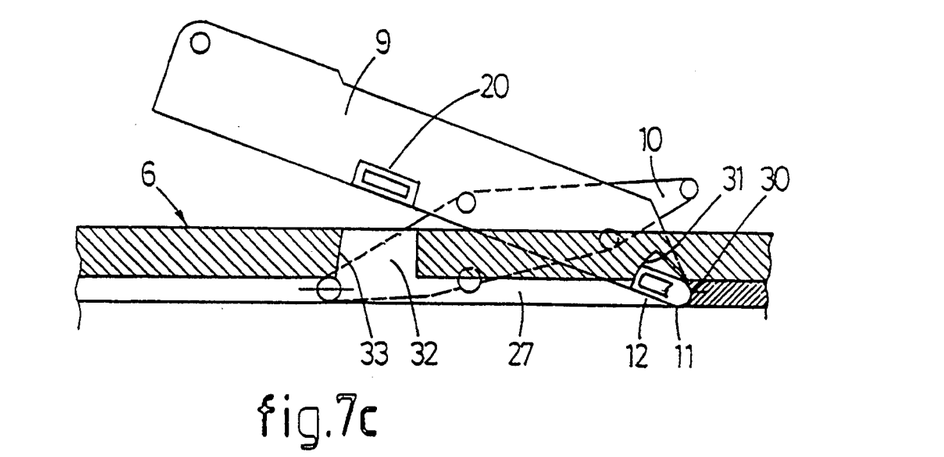

FIG. 7a–7c show the position of the lifter means 5 corresponding to a position of the panel 3 in which it is tilted through a small angle upwardly from the closed position.

FIG. 7a illustrates that the first guide pin 23 of the auxiliary lever 10 has left the first guide slot 17 in the set-out lever 9 and the second guide pin 24 of the auxiliary lever 10 has reached, through the curved portion 18'', the front portion 18''' of the second guide slot 18 in the set-out lever 9. A further relative sliding movement between the auxiliary lever 10 and the set-out lever 9 is consequently no longer possible. A further forward displacement of the first transverse pin 21 of the auxiliary lever 10 by means of the pull and push cable 8 results in a scissor movement of both levers 9 and 10 relative to each other. A locking against a relative sliding movement of both levers 9 and 10 is accomplished by the abutments of the guide face 19 of the set-out lever 9 against the guide face 25 of the auxiliary lever 10 on the one hand and the abutment of the second guide pin 24 of the auxiliary lever 10 against the wall at the front end of the second guide slot 18 in the set-out lever 9 on the other hand.

As shown in FIG. 7b, a pivoting movement of the auxiliary lever 10 is permitted in this position because the second and third transverse pin 22 and 26 are allowed to move upwardly within the inclined second guide groove 28, and the inclined portion 29'' of the third guide groove 29 respectively. This engagement of the guide pins 22 and 26 in the inclined guide grooves 28 and 29 in the stationary guide rail 6 also contributes to the prevention of a sliding movement between the auxiliary lever 10 and the set-out lever 9.

It can be seen in FIG. 7c that the guide cam 20 of the set-out lever 9 has already left the passage opening 32 in the stationary guide rail 6, but that the guide cam 12 has already come well into engagement with the respective guide and locking face 31 of the stationary guide rail 6 so that the locking of the set-out lever 9 against the rearward sliding movement in the stationary guide rail has been taken over fully by the guide cam 12 and the guide and locking face 31.

Figure 8A:
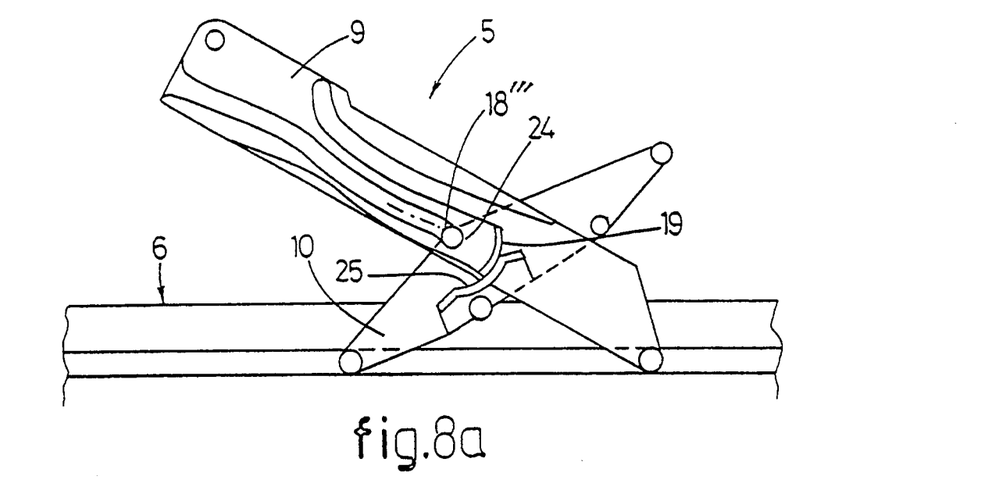
Figure 8B:
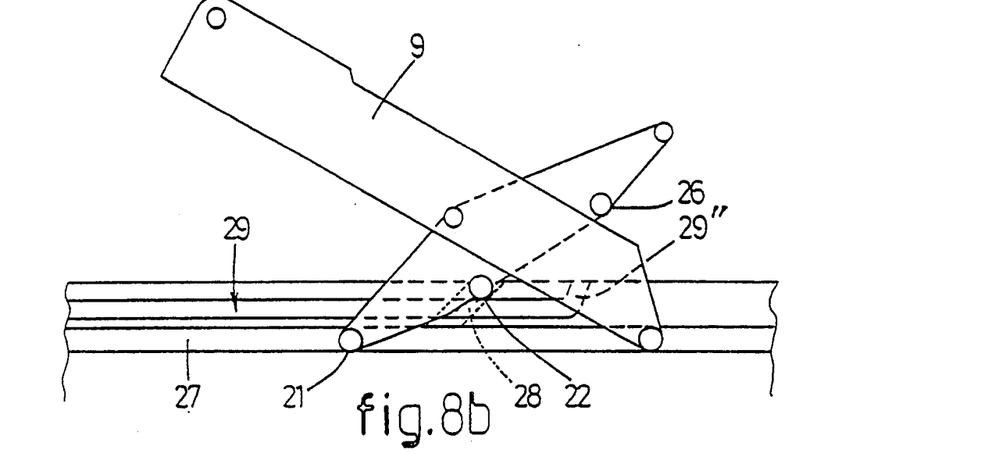
Figure 8C:
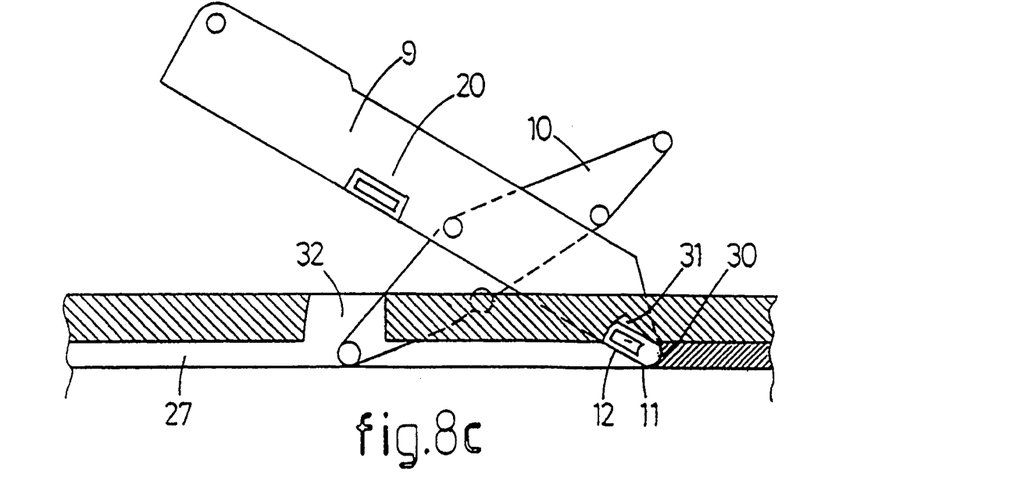

FIG. 8a–8c illustrate the position of the lifter means 5 corresponding to a tilting movement of the panel 3 through a larger angle than in FIG. 7a–7c.

In FIG. 8a can be seen that the guide face 19 of the set-out lever 9 has come further into engagement with the guide face 25 of the auxiliary lever 10.

FIG. 8b illustrates that the first transverse pin 21 has been displaced further forward in the first guide groove 27 of the stationary guide rail 6, that the second transverse pin 22 of the auxiliary lever 10 has reached the upper end of the second guide groove 28 of the stationary guide rail 6 and that the third transverse pin of the auxiliary lever 10 has already left the inclined portion 29'' of the third guide groove in the stationary guide rail 6. If from this position the first transverse pin 21 is displaced further forward by the pull and push cable 8 the second transverse pin 22 will also leave the respective guide slot so that the auxiliary lever 10 is then in engagement with the stationary guide rail 6 only by means of the transverse pin 21.

FIG. 8c only shows in addition that the guide cam 12 is displaced along the front guide and locking face 31 as a result of the further rotational movement of the set-out lever 9.

Upon a further forward displacement of the first transverse pin 21 of the auxiliary lever 10 by the pull and push cable 8 the set-out lever 9 and the auxiliary lever 10 will carry out a further relative scissor movement until the guide cam 12 of the set-out lever 9 has contacted the respective wall of the stop 30 with its sidewall or until the drive of the pull and push cable 8 has reached its extreme position. The movement of the panel 3 from the maximum venting position back to the closed position and thereupon to the sliding position takes place by a reversed adjusting movement by the lifter means 5 as described above.

FIG. 2–4 show a further aspect of the invention relating to the support on the front side of panel 3. As already mentioned, the panel 3 is provided near the front side with a front support 4 guided in the stationary guide rail 6. More particularly the front support 4 includes a bracket 34, mounted onto the lower side of the panel and carrying on the lower end a slide pin 35 projecting in transverse direction to both sides. This slide pin 35 has both of its ends in engagement with said guide groove 27 of the stationary guide rail 6, wherein the slide pin 35, however, projects not so deep into the double guide groove 27 so that the slide pin 35 does not come in contact with the stop 30 for the transverse pin 11 of the set-out lever 9. The guide groove 27 comprises on its front end a forwardly and upwardly inclining ramp section 36 and a horizontal end portion 37 connecting thereto. At the front end of the end portion 37 of the guide groove 27 of the stationary guide rail 6 there is formed a stationary support wall 38 adapted to cooperate with the bracket 34 of the front support 4 in a manner which will be indicated further on. The support wall 38 may be attached to the stationary guide rail 6 or to the frame 7 in a manner adjustable in longitudinal direction in order to be adapted to the length of the panel 3.

The operation of the front support 4 of the panel 3 is as follows.

As shown in FIG. 2, when the panel 3 is in the closed position, the slide pin 35 of the support 4 is entirely at the front of the end portion 37 of the guide groove 27 of the stationary guide rail 6, while the bracket 34 abuts to the support wall 38 of the stationary guide rail 6 with its front edge.

When the panel 3 is tilted to the venting position of FIG. 3 by means of the lifter means 5, the rotation of the bracket 34 of the panel 3 and its engagement with the support wall 38 of the stationary guide rail 6 causes the slide pin 35 to be pushed slightly rearwardly within the end portion 37 of the guide groove 27 so that the panel 3 is displaced slightly rearwardly during its tilting movement. As a result the forward movement of the front edge of the panel 3 as a consequence of the tilting movement of the panel 3 about the slide pin 37 is compensated and a seal 39 at the front edge of the panel 3 is prevented from being damaged due to the displacement of said front edge with respect to the fixed roof 1. It is noted that spring 16 keeps the panel 3 loaded forwardly during the displacement of the pivot pin 13 of the set-out lever 9 through the short longitudinal slot 14 in the section 15 under the panel 3.

In the position of the panel 3 according to FIG. 4, the slide pin 35 of the front support 4 has been displaced slightly downwardly due to the displacement along the ramp section 36 of the guide groove 37 of the stationary guide rail 6, as a result of which the panel 3 is also displaced slightly downwardly so that the panel 3 may be slid completely backwardly under the fixed roof 1.

From the foregoing it will be clear that the correcting movements of the front side of the panel 3 in vertical direction and in longitudinal direction of the roof panel assembly can be obtained in a very simple manner and by very simple means.

In general, the present invention provides a roof panel assembly which is supported in a very stable manner, particularly as a result of the lifter means which combines stability with a small built-in height thereby permitting a small built-in height of the total roof panel assembly. Nonetheless, it is possible to achieve a considerable tilting height of the panel, while the path of adjustment of the drive means, e.g. the pull and push cable, is relatively long, so that an accurate adjustment of the panel during its tilting movement is simple. Furthermore, the guided adjustment of the set-out lever and the auxiliary lever does not require an additional movable guide element, such as a slide plate or the like, so that the adjusting means for the panel can manage with fewer moving parts and locking and releasing means. The transition between different adjusting movements of the lifter means are very well secured so that the adjustment of the lifter means may be carried out in a reliable manner also for a longer time.

I claim:

1. A tiltable and slidable roof panel assembly for a motor vehicle having a fixed roof (1), comprising: a roof panel (3) supported by a front support (4), a rearward lifter means (5) on a respective guide rail (6) extending along a side of an aperture (2) in the fixed roof (1) and rearwardly beyond the aperture of the fixed roof, said lifter means (5) being adapted to be driven by a driving means (8) in a sliding movement along the guide rail (6) and in an up and down movement to enable the roof panel (3) to pivotally move between a closed position and an upwardly displaced venting position and between the closed position and a downwardly displaced position prior to the sliding movement of the roof panel (3), said lifter means (5) including a set-out lever (9) being at least in pivotal engagement with the roof panel (3) through a first pivot (13) and being pivotally and slidably connected with the guide rail (6) by a second pivot (11), and further including an auxiliary lever (10) joined to the set-out lever (9) with a third pivot, the third pivot allowing the auxiliary lever (10) to slide with the set-out lever (9) relative to the guide rail (6), the third pivot allowing the auxiliary lever (10) to pivot relative to the set-out lever (9) during pivotal movement of the roof panel (3), and the third pivot sliding within a forcing guide for relative sliding movement longitudinally along one of the levers during pivotal movement of the roof panel (3), whereby during the relative sliding movement between the set-out lever (9) and the auxiliary lever (10) one of the levers is prevented from substantial sliding relative to the guide rail (6) by means of a fixed locking stop (30) connected to the guide rail (6) contacting the lifter means (5).

2. The assembly as in claim 1, wherein the set-out lever (9) is substantially prevented from sliding during pivotal movement of the roof panel (3) and the auxiliary lever (10) is in engagement with the driving means (8).

3. The assembly as in claim 2 and means connected to the auxiliary lever (10) for preventing the auxiliary lever (10) from pivoting relative to the guide rail (6) during the relative sliding movement between the auxiliary lever (10) and the set-out lever (9).

4. The assembly as in claim 1, wherein the third pivot comprises a pivot pin (24) fixed to one of the levers, the pivot pin (24) being able to slide in a slot (18) in the other lever.

5. The assembly as in claim 4, wherein the third pivot further comprises a second pivot pin (23) fixed to one of the levers, the second pivot pin (23) being able to slide in a second slot (17) in the other lever.

6. The assembly as in claim 5, wherein the slot (18) and the second slot (17) are formed in the set-out lever (9), and the pin (24) and the second pivot pin (23) are provided on the auxiliary lever (10).

7. The assembly as in claim 1, wherein initial pivoting movement of the auxiliary lever (10) from a position in which the auxiliary lever (10) is prevented from pivoting is performed by, guide means (22,28;26,29) connected to the auxiliary lever (10) and the stationary guide rail (6).

8. (Twice Amended) The assembly as in claim 7, wherein the guide means includes one transverse pin (22) provided on the auxiliary lever (10) and an inclined guide slot (28) formed in the guide rail (6).

9. The assembly as in claim 1, wherein the front support (4) of the roof panel (3) is attached to the roof panel (3) and is slidably guided in the guide rail (6, 27), said guide rail (6, 27) including a short ramp section (36) on a front portion thereof.

10. The assembly as in claim 1 and further including a support wall (38) positioned near a front end of the guide rail (6,27) adjacent to the front support (4,34) when the roof panel (3) is in the closed position, wherein the front support (4) comprises a bracket (34) connected to the roof panel (3) and a pivot (35) connected to the bracket (34), the pivot (35) guided by the guide rail (6) during pivotal movement of the roof panel (3), and wherein a surface of the bracket (34) pivots on the support wall (38) and the pivot (35) displaces rearwardly during pivotal movement of the panel (3) to cause slight rearward movement of the panel (3).

11. A slidable roof panel assembly for a motor vehicle comprising:
a roof panel ( 3 );
a guide rail (6) extending along a side of an aperture (2) in a roof of the motor vehicle below the roof panel (3), the guide rail (6) having a first guide portion (27), a forwardly inclined guide portion (36) connected to the first guide portion (27) and a second substantially horizontal guide portion (37) connected to the inclined portion (36) on an end opposite the first guide portion (27);
an adjustable lifter means (5) connected to the roof panel (3) and a slidably connected to the guide rail (6), the adjustable lifter means (5) moving the roof panel (3) between a closed position wherein the roof panel (3) closes the aperture (2) and an upwardly inclined venting position, and between the closed position and a downwardly displaced position wherein the roof panel (3) can be slid under the roof of the motor vehicle;
a front support (4) joined to the roof panel (3) and slidably connected to the guide rail (6), the front support (4) permitting pivotal movement of the roof panel (3) about a pivot axis perpendicular to the guide rail (6) and sliding movement of the roof panel (3) along the guide rail (6) wherein the front support (4) is located in the second substantially horizontal guide portion (37) when the roof panel (3) is in the closed position, and wherein the front support (4) is slidably guided in the second substantially horizontal portion (37), the inclined portion (36) and the first guide portion (27), for movement of the roof panel (3) under the roof from the closed position; and
means for displacing the front support a selected distance rearwardly from a front edge of the aperture (2) during movement of the roof panel (3) from the closed position to the inclined venting position, said means being positioned closer to the front support (4) than to the adjustable lifting means (5).

12. The assembly of claim 11 wherein the means for displacing the front support comprises a support wall (38) positioned adjacent the front support (4) when the roof panel (3) is in the closed position, wherein a surface of the front support (4) pivots on the support wall (38) to displace the front support (4).

13. The assembly as in claim 1, wherein the locking stop (30) prevents substantial sliding movement of the set-out lever (9) in one direction by contacting the second pivot (11).

14. A tiltable and slidable roof panel assembly for a motor vehicle having a fixed roof (1), comprising: a roof panel (3) supported by a front support (4), a rearward lifter means (5) on a respective guide rail (6) extending along a side of an aperture (2) in the fixed roof (1) and rearwardly beyond the aperture of the fixed roof, said lifter means (5) being adapted to be driven by a driving means (8) in a sliding movement along the guide rail (6) and in an up and down movement to enable the roof panel (3) to pivotally move between a closed position and an upwardly displaced venting position and between the closed position and a downwardly displaced position prior to the sliding movement of the roof panel (3), said lifter means (5) including a rigid set-out lever (9) being connected at an end to the roof panel (3) through a first pivot (13) and being pivotally and slidably connected with the guide rail (6) by a second pivot (11), and further including an auxiliary lever (10) joined to the set-out lever (9) with a third pivot, the third pivot allowing the auxiliary lever (10) to slide with the set-out lever (9) relative to the guide rail (6), the third pivot allowing the auxiliary lever (10) to pivot relative to the set-out lever (9) during pivotal movement of the roof panel (3), and the third pivot sliding within a forcing guide for relative sliding movement longitudinally along one of the levers during pivotal movement of the roof panel (3), whereby during the relative sliding movement between the set-out lever (9) and the auxiliary lever (10) one of the levers is prevented from substantial sliding relative to the guide rail (6) by means of a locking stop (30).

15. The assembly as in claim 14, wherein the set-out lever (9) is substantially prevented from sliding during pivotal movement of the roof panel (3) and the auxiliary lever (10) is in engagement with the driving means (8).

16. The assembly as in claim 14, wherein the third pivot comprises a pivot pin (24) fixed to one of the levers, the pivot pin (24) being able to slide in a slot (18) in the other lever.

17. The assembly as in claim 14, wherein the front support (4) of the roof panel (3) is attached to the roof panel (3) and is slidably guided in the guide rail (6, 27), said guide rail (6, 27) including a short ramp section (36) on a front portion thereof.

18. A tiltable and slidable roof panel assembly for a motor vehicle having a fixed roof (1), comprising: a roof panel (3) supported by a front support (4), a rearward lifter means (5) on a respective guide rail (6) extending along a side of an aperture (2) in the fixed roof (1) and rearwardly beyond the aperture of the fixed roof, said lifter means (5) being adapted to be driven by a driving means (8) in a sliding movement along the guide rail (6) and in an up and down movement to enable the roof panel (3) to pivotally move between a closed position and an upwardly displaced venting position and between the closed position and a downwardly displaced position prior to the sliding movement of the roof panel (3), said lifter means (5) including a set-out lever (9)

being at least in pivotal engagement with the roof panel (3) through a first pivot (13) and being pivotally and slidably connected with the guide rail (6) by a second pivot (11), and further including an auxiliary lever (10) joined with slide means (21) to the guide rail (6) and joined to the set-out lever (9) with a third pivot, the third pivot being at a position spaced apart from the slide means (21) and allowing the auxiliary lever (10) to slide with the set-out lever (9) relative to the guide rail (6), the third pivot allowing the auxiliary lever (10) to pivot relative to the set-out lever (9) during pivotal movement of the roof panel (3), and the third pivot sliding within a forcing guide for relative sliding movement longitudinally along one of the levers during pivotal movement of the roof panel (3), whereby during the relative sliding movement between the set-out lever (9) and the auxiliary lever (10) one of the levers is prevented from substantial sliding relative to the guide rail (6) by means of a locking stop (30).

19. The assembly as in claim 18, wherein the set-out lever (9) is substantially prevented from sliding during pivotal movement of the roof panel (3) and the auxiliary lever (10) is in engagement with the driving means (8).

20. The assembly as in claim 18, wherein the third pivot comprises a pivot pin (24) fixed to one of the levers, the pivot pin (24) being able to slide in a slot (18) in the other lever.

21. The assembly as in claim 18, wherein the front support (4) of the roof panel (3) is attached to the roof panel (3) and is slidably guided in the guide rail (6, 27), said guide rail (6, 27) including a short ramp section (36) on a front portion thereof.

* * * * *

UNITED STATES PATENT AND TRADEMARK OFFICE
CERTIFICATE OF CORRECTION

PATENT NO. : 5,358,303
DATED : October 25, 1994
INVENTOR(S) : Johannes N. Huyer

It is certified that error appears in the above-indentified patent and that said Letters Patent is hereby corrected as shown below:

Column 9, line 7, delete "(Twice Amended)".

Signed and Sealed this

Fourteenth Day of February, 1995

Attest:

BRUCE LEHMAN

*Attesting Officer*  *Commissioner of Patents and Trademarks*